US012097587B2

(12) United States Patent
Yim et al.

(10) Patent No.: US 12,097,587 B2
(45) Date of Patent: Sep. 24, 2024

(54) CURED SILICONE BASED WORKHOLDING METHOD AND APPARATUS FOR MILLING MACHINES

(71) Applicants: Michael Pui Hei Yim, Hong Kong (CN); Lok Yan So, Hong Kong (CN)

(72) Inventors: Michael Pui Hei Yim, Hong Kong (CN); Lok Yan So, Hong Kong (CN)

(73) Assignee: Michael Pui Hei YIM, Hong Kong (CN)

( * ) Notice: Subject to any disclaimer, the term of this patent is extended or adjusted under 35 U.S.C. 154(b) by 405 days.

(21) Appl. No.: 17/361,282

(22) Filed: Jun. 28, 2021

(65) Prior Publication Data

US 2022/0305598 A1    Sep. 29, 2022

(30) Foreign Application Priority Data

Mar. 25, 2021    (CN) .......................... 202110316964.7

(51) Int. Cl.
*B23Q 3/08*    (2006.01)
(52) U.S. Cl.
CPC .................................... *B23Q 3/086* (2013.01)
(58) Field of Classification Search
CPC .......... B23Q 3/08; B23Q 3/086; B25B 11/00; Y10T 29/49998
USPC .............................................................. 269/7
See application file for complete search history.

(56) References Cited

U.S. PATENT DOCUMENTS

| | | | | |
|---|---|---|---|---|
| 3,834,687 A * | 9/1974 | Martin | .................. | B25B 11/005 269/7 |
| 5,716,257 A * | 2/1998 | Gallo | ..................... | B23Q 3/086 451/76 |
| 6,073,451 A * | 6/2000 | Tarumizu | ............... | B23Q 3/086 62/62 |
| 6,484,513 B1 * | 11/2002 | Chou | ..................... | B23Q 3/086 62/3.62 |
| 2020/0055156 A1 * | 2/2020 | Machac | .................. | B23Q 3/18 |

* cited by examiner

*Primary Examiner* — Matthew P Travers
(74) *Attorney, Agent, or Firm* — George G. Wang; Bei & Ocean (57) ABSTRACT

A workholding device for positioning a workpiece on a machining equipment, comprising a sacrificial support for supporting the workpiece, a workpiece holding layer formed of a curable material applied onto the sacrificial support, a curable material collector, a curing processing unit which comprises a controller and a curing rate regulator, and a bearing assembly for supporting the sacrificial support, the curable material collector and the curing processing unit, wherein the curable material is a solid which is viscous before curing and elastic after curing and has a melting point above 1000° C.

19 Claims, 4 Drawing Sheets

CURED SILICONE BASED WORKHOLDING METHOD AND APPARATUS FOR MILLING MACHINES

FIELD OF THE INVENTION

The present application relates to the machining of a workpiece, in particular to a device and a method for positioning a workpiece on a machining equipment, and more particularly to a cured silicone based workholding device and method for milling machines.

BACKGROUND OF THE INVENTION

Milling machine is a machine tool for various applications, wherein a milling cutter is used as a tool to machine the workpiece's surface, and the machining process can also be referred to as "milling". The workpiece is mounted onto a platform or other attachments during milling. Typically, the milling cutter mainly moves by rotation, while the workpiece moves by advancement. Milling machine is operated to progressively remove material from a workpiece by using rotary cutters with sharp teeth that are rotating at high speeds. By advancing the rotary cutter over the workpiece in a systematic way, unwanted material can be cut away from the workpiece, converting the workpiece to a desired shape. In addition to milling planes, grooves, gear teeth, threads and spline shafts, the milling machine can also machine more complex profiles.

The process of milling is often regarded as subtractive manufacturing, that is, the unwanted block of stock material is successively cut away, until what remains is the desired three-dimensional shape. The process of milling can be performed on almost any material, including aluminum, copper, steel, brass, titanium, wood, foam, fiberglass, and plastics such as polypropylene and acrylic. Traditional milling machines are hand-operated, while modern milling machines are often computer-controlled and known as CNC (Computer Numerical Control) milling machines. These machines have their cutting path specified in a computer file and controlled via a computer program. Milling is extremely useful for rapid prototyping, because product designers can very quickly and inexpensively produce prototypes of their creation in the design and development phase, without the cost in mass scale manufacturing techniques such as injection molding. Besides rapid prototyping, milling is also useful to manufacture final products, especially for materials that are not very hard such as wood, where the subtractive manufacturing is well suited for.

During milling, it is necessary to temporarily secure the workpiece onto a platform of the milling machine, which is known as "workholding". While the rotary cutter is rotating and cutting into the workpiece, it exerts a lot of force on the material. If the workpiece is not well secured onto the milling machine's platform, it may accidentally move out of place with respect to the rotary cutter's path of movement. This can ruin the workpiece and even put the operator of the milling machine in physical danger. Several traditional solutions to workholding will be described below, but each has disadvantages to some extent.

Vertical Clamps

Vertical clamps work by exerting pressure vertically on the top of the workpiece. Pressing the workpiece downward can increase the friction between the workpiece and the milling machine's platform, and prevent the workpiece from moving with this friction. The vertical clamps themselves can be secured onto the milling machine's platform with various means such as screws and other clamps. One major disadvantage of vertical clamps is that the clamp itself gets in the way of the rotary cutter by physically occupying a space above the workpiece, and thus prevents the rotary cutter from reaching certain parts of the workpiece. Also, if the platform needs to move in advance, the clamp also needs to move synchronously, making the structure more complicated. Additionally, if a part of the workpiece needs to be cut out from the raw material completely to form its final shape, it will eventually detach from the raw material. Since the vertical clamp is only exerting a force on the raw material, and not necessarily on the final detached object, the detached part may move out of place with respect to the rotary cutter. This may ruin the part as well as put the milling machine's operator in physical danger.

Horizontal Clamps

Horizontal clamp is a clamp with force acting in the horizontal direction, and works by exerting pressure horizontally on the sides of the workpiece, thereby preventing the workpiece from moving with the friction force generated. The horizontal clamps themselves can be secured onto the milling machine's platform with various means such as screws and other clamps. As the horizontal clamps contact the workpiece on the sides thereof, the rotary cutter is capable of reaching a bigger proportion of the workpiece as compared to the vertical clamps. However, if the workpiece needs to be cut horizontally all the way through beyond an edge of the material, the rotary cutter may come in contact with the horizontal clamps themselves. This may damage the clamps and the rotary cutter as well as put the operator of the machine in physical danger. Similar to the use of vertical clamps, if the workpiece needs to be cut out from the raw material completely to form its final shape, it will eventually detach from the raw material. Since the horizontal clamp is only exerting a force on the raw material, and not necessarily on the final detached object, the detached part may move out of place with respect to the rotary cutter. This may also ruin the part as well as put the milling machine's operator in physical danger.

Magnetic Clamps

Magnetic clamps use either permanent magnets or electromagnets to exert a magnetic force on the workpiece. Magnetic clamps are placed in between the top of the milling machine's platform and the bottom of the workpiece, and the magnetic force thereof pulls down the workpiece, and the resulting friction force between the respective surfaces can prevent the workpiece from accidentally moving. The magnetic clamps themselves can be secured onto the milling machine's platform with various means such as screws and other clamps. Unlike the vertical and horizontal clamps, magnetic clamps have the ability to secure even the cut-out workpieces. However, one major disadvantage of magnetic clamps is that they only work for workpieces made of magnetic materials such as certain metals.

Vacuum Tables

Vacuum tables are arranged between the top of the milling machine's platform and the bottom of the workpiece. Vacuum tables themselves can be secured onto the milling machine's platform with various means such as screws and other clamps. A surface of the vacuum table that is touching the workpiece is porous, and small holes lead to an internal vacuum chamber. A vacuum pump is used to pump out air inside the vacuum chamber to keep the vacuum chamber below atmospheric pressure. The workpiece is held in place by the pressure difference between the vacuum chamber and the outside air. Air pressure in the environment will exert a downward force on the workpiece, thereby increasing the friction between the workpiece and the surface of the vacuum table. This friction can prevent the workpiece from accidentally moving. One major disadvantage of vacuum tables is that the force exerted on the workpiece is proportional to the surface area of the workpiece. For smaller workpieces, this force may not be enough to firmly hold the material in place. Also, if the workpiece needs to be cut out from the raw material completely to form its final shape, the finally cut-out piece will eventually detach from the raw material. This detachment may result in air leaking back into the vacuum chamber, and destroy the air pressure differential between the outside air and the vacuum chamber, which may result in disappearance of the pressure exerted on the workpiece to prevent its accidental movement. In addition, vacuum tables tend to be expensive. When the vacuum pump is pumping air out from the vacuum chamber, there will be a lot of audible noise involved.

Adhesives

Any type of adhesives may be used for workholding, temporarily gluing the workpiece onto the milling machine's platform to hold it in place. The use of adhesives has the advantage of being able to secure even cut-out workpieces. However, the disadvantage is that it is not always easy to remove the finished piece off the platform, and that there may also be adhesive residue left of the workpiece and platform that takes effort to clean off. Furthermore, if the workpiece needs to be cut out from the raw material completely, the rotary cutter may come in contact with the adhesive. Since the rotary cutter is rotating at high speeds when cutting the workpiece, the heat generated by the friction of cutting may melt the adhesive and cause it to stick to the rotary cutter, eventually ruining the cutter tool.

Double-Sided Tape

Double-sided tape works similarly to adhesives, and has similar disadvantages such as residue left on the workpiece as well as on the rotary cutter.

Gluing Back-to-Back Single-Sided Masking Tape

This method involves sticking a single-sided masking tape on the top of the milling machine's platform as well as on the bottom of the workpiece, and then gluing a masking tape from the bottom of the workpiece to a masking tape from the top of the milling machine's platform. This method is advantageous over just using adhesives or double-sided tape, because masking tape is often easier to be removed from the workpiece and platform without any residue left. However, if the workpiece needs to be cut all the way through the material vertically, the rotary cutter may still come in contact with the masking tape as well as the glue in between. Therefore, the adhesives may melt and stick onto the cutter tool, due to the heat from the friction. This may ruin the rotary cutter.

Bridges and Tabs

Bridges and tabs are small design features that are left uncut from the raw material so that they are never completely detached from the workpiece during milling. This method can be used in conjunction with other workholding methods stated above, to prevent the final part from detaching and moving out of place during milling. Once milling is complete, the bridges are broken off from the tabs manually. The disadvantage of this method is that there may be post-processing work in sanding away the broken off tabs, which increases the process steps and costs.

SUMMARY OF THE INVENTION

In order to solve or at least partially solve the above-mentioned issues, the present invention provides a workholding device for positioning a workpiece on a machining equipment, comprising: a sacrificial support for supporting the workpiece; a workpiece holding layer formed of a curable material applied onto the sacrificial support, which secures the workpiece at a predetermined position on the sacrificial support after completion of the curing, the sacrificial support and the workpiece holding layer allowing for being damaged by a cutting tool of the machining equipment during machining of the workpiece; a curable material collector which is arranged below the sacrificial support for collecting the curable material detached from the sacrificial support during the application of the curable material, the curing of the curable material, and/or the machining of the workpiece; a curing processing unit which comprises a controller and a curing rate regulator, the controller controlling the curing rate regulator to adjust curing rate of the curable material by changing at least one of the factors affecting curing; and a bearing assembly for supporting the sacrificial support, the curable material collector and the curing processing unit, which is configured to be removably mounted to the machining equipment.

In a preferred embodiment, the sacrificial support is plate-shaped and has a flat surface contacting the workpiece via the workpiece holding layer, and at least one through-holes penetrating the sacrificial support are formed on the flat surface. Furthermore, a plurality of through-holes may be formed on the flat surface, and at least one of the plurality of through-holes is adapted to mount a workpiece clamp.

In a preferred embodiment, the curable material is a solid that is viscous when uncured and is elastic after curing, and a melting point of the solid is above 1000° C. A kind of the curable material is silicone rubber.

In a preferred embodiment, the factors affecting curing include temperature, the curing rate regulator includes a heating pad, and the controller controls the heating pad to adjust curing rate of the curable material by varying the curing temperature. The heating pad clings to the curable material collector, and the curable material collector is made of a thermally conductive material.

In a preferred embodiment, the factors affecting curing include ultraviolet rays, the curing rate regulator includes an ultraviolet light source, and the controller controls the ultraviolet light source to adjust curing rate of the curable material by varying ultraviolet radiation parameters. The ultraviolet light source is located below the curable material collector, and the curable material collector is made of an ultraviolet transparent material.

In another aspect, the present invention provides a method for positioning a workpiece on a machining equipment, comprising: providing a sacrificial support, which allows for being damaged by a cutting tool of the machining equipment during machining of the workpiece; applying a curable material onto the sacrificial support; placing the workpiece on the sacrificial support while the curable material is not cured; curing the curable material to form a workpiece holding layer, and securing the workpiece at a predetermined position on the sacrificial support; providing a curing processing unit, which comprises a controller and a curing rate regulator, the controller controlling the curing rate regulator to adjust curing rate of the curable material by changing at least one of the factors affecting curing; providing a curable material collector, which is used to collect the curable material detached from the sacrificial support during the application of the curable material, the curing of the curable material, and/or the machining of the workpiece; and providing a bearing assembly, which is used to support the sacrificial support, the curable material collector and the curing processing unit, and which is removably mounted to the machining equipment.

Compared with the prior art, the workholding device provided in the embodiments of the present application has many advantages. For example, compared with vertical clamps and horizontal clamps, silicone rubber does not occupy the space of the workpiece in various directions, and can be machined better in multiple directions. Compared with magnetic clamps, the workholding device provided in the embodiments of the present application has no special requirements on the material of the workpiece. Compared with vacuum table, the silicone rubber is low in cost and inducing no noise, and is capable of separating a whole piece of the workpiece from a raw material. Compared with fixation by adhesives, the silicone rubber is resistant to high temperature and will not adversely affect the milling cutter. Also, the workholding device provided in the embodiments of the present application can secure the workpiece by means of atmospheric pressure, so it is easy to separate the workpiece, with no residues generated. Compared with the design of bridges and tabs, the workholding device provided in the embodiments of the present application has many advantages such as fewer machining steps, lower cost, and higher yield.

BRIEF DESCRIPTION OF THE DRAWINGS

In order to more clearly illustrate technical solutions in the embodiments of the present application or the prior art, the drawings to be used in the description of the embodiments or the prior art will be briefly introduced below. Obviously, the drawings in the following description are only used to illustrate some embodiments of the present application. Those of ordinary skill in the art can obtain other features, connection relations and even method steps that are not mentioned in the drawings from these drawings, without creative work.

DETAILED DESCRIPTION OF THE INVENTION WITH EMBODIMENTS

In order to make the purposes, technical solutions and advantages of the embodiments of the present application clearer, the technical solutions in the embodiments of the present application will be clearly and expressly described below with reference to drawings. Apparently, the described embodiments are merely a part of the embodiments of the present application, but not all of the embodiments. All other embodiments obtained by those of ordinary skill in the art based on the embodiments in this application without creative work shall fall within the protection scope of this application.

The workholding device and method according to the present invention are suitable for various machining techniques. Taking milling as an example, the workholding device is positioned on the milling machine's platform in the preparation step. The workpiece to be machined is subsequently secured onto the workholding device with a cured workholding layer (such as silicone rubber). When the silicone rubber is in its uncured state, it is normally in the form of a gel or high viscosity liquid. The liquid silicone can be poured onto any object's surface to take on the shape of this surface, due to its viscous nature. When the silicone is subsequently cured in place, it will harden and become a solid rubber with the same shape as well.

By exploiting such properties of the silicone rubber, it can be used to secure workpieces. First, the uncured liquid silicone is poured onto a sacrificial support (e.g., wasteboard) located at the upmost of the workholding device. While the silicone is still in liquid form, the workpiece is placed over a puddle formed by accumulation of the liquid silicone. By applying a pressure on top of the workpiece, the silicone will be squeezed out into a thin layer of liquid that is shaped precisely to fill a vertical gap between the bottom of the workpiece and the top of the wasteboard, and even a gap at the microscopic level. This will eliminate the air between the two surfaces. The liquid silicone is then allowed to rapidly cure into a solid silicone rubber by activating a curing processing unit. As the silicone cures, it will form a tight vacuum with the bottom of the workpiece and the top of the wasteboard respectively. Air pressure in the environment will cause the solid silicone rubber to stick to the top of the wasteboard as well as to the bottom of the workpiece via suction, holding the workpiece in place. After milling is completed, the workpiece can be easily removed by applying a horizontal force that is perpendicular to the suction force of the silicone rubber. Since the silicone rubber is elastic, it can also be peeled off easily without any leftover residue.

The workholding device described above has many advantages over prior art. During milling, the workpiece will be held securely in a predetermined location without obstructing the rotary cutter in any way. Since the silicone has been cured into a solid rubber that is chemically inert, it will not chemically react with any surface and is easy to clean up without any residue. Even if the rotary cutter comes in contact with the silicone rubber during milling, the silicone rubber will not stick to the rotary cutter, as silicone is chemically structured to never melt regardless of high temperatures.

Notably, though silicone rubber is used above as an example to describe the technical concept of the present invention, other curable materials are also suitable for the invention. Preferably, the curable materials have the following characteristics:
1. It is a viscous liquid in uncured form;
2. It is curable to a solid in a short period of time;
3. It is an elastic solid in cured form;
4. The solid in cured form has a high melting point of e.g. 1000° C. or more, so as not to melt during machining of the workpiece.

In order to improve the curing efficiency and realize the rapid fixation of the workpiece, the workholding device according to the present invention is designed to facilitate the curing of curable materials. Various members of the workholding device will be described below with reference to the drawings.

Base Plate

Figure 1:
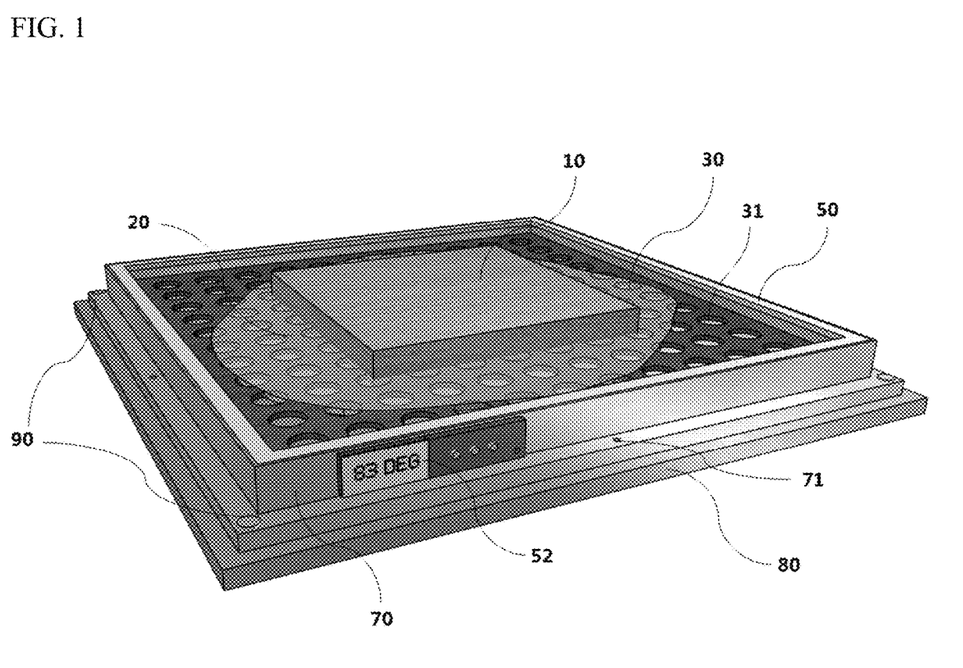
FIG. 1 is an overall schematic diagram of a workholding device according to the present invention.
Figure 2:
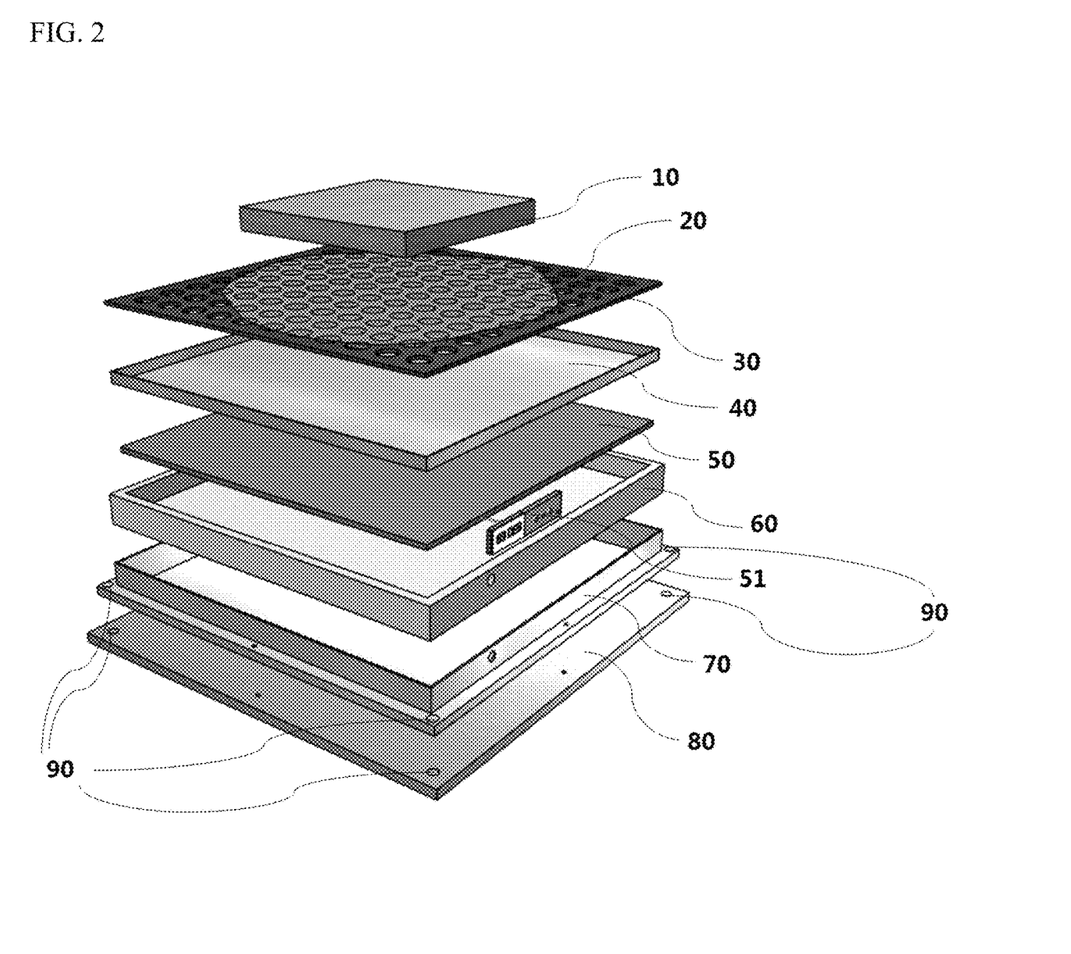
FIG. 2 is an exploded schematic diagram of the workholding device according to the present invention.

The purpose of base plate 80 is to allow tray frame 70 to be easily mounted to and dismounted from a machine tool (such as a milling machine). It allows one tray frame 70 to be swapped with another in a position-consistent way. The base plate 80 can be secured onto the milling machine's platform via traditional means like screws and clamps. The base plate 80 may be made of a sturdy material, such as aluminum, iron, stainless steel or the like.

Tray Frame

The tray frame 70 and base plate 80 constitute a bearing assembly. The tray frame 70 can be mounted to the base plate 80 either by fastening screws through the screw holes 71 shown in FIG. 1, or by employing magnets 90 arranged at an edge and/or a corner. The magnets not only allow quick mounting/dismounting of the workholding device, but also allow the consistent positioning of the workholding device relative to the milling machine. In the embodiment shown in FIGS. 1 and 2, a set of four programmed magnets 90 are placed at the corners of the base plate 80, and another set of four programmed magnets 90 are placed at the corners of the tray frame 70, such that the two sets of magnets 90 are aligned and attracted to each other, achieving precise positioning.

Alignment programmed magnets are rare-earth neodymium magnets that have gone through a special magnetization process changing a shape of their magnetic fields in order to achieve precise alignment properties. When two alignment programmed magnets snap to each other, they will do so at very precise positions relative to each other. When the magnets of the tray frame 70 snap in place to the magnets of the base plate 80, the tray frame 70 will be held in place by the magnetic forces between all the pairs of magnets 90. Since the position where the magnets of the tray frame 70 snap to the magnets of the base plate 80 is consistent and repeatable each time the workholding device is mounted, consistent positioning of the workholding device can be achieved. It is important to ensure the consistent positioning of the workholding device during machining of the workpiece for several reasons. For example, in case an unfinished milling operation is continued on a previously swapped out workholding device, it is vitally important to be able to position the workholding device in a similar position and orientation as compared to previously. Otherwise, path of the rotary cutter will be off the predetermined path and the workpiece will be ruined. Ideally, the tray frame 70 is made of a sturdy material such as aluminum or stainless steel.

Thermal Insulator

In a preferred embodiment, a thermal insulator 60 is provided between the curing processing unit 50 and the bearing assembly (the tray frame 70 and base plate 80) to form a thermal insulation layer. The purpose of thermal insulation layer is two-fold. Firstly, it is used to shield the electronics 51 of the curing processing unit 50 and the tray frame 70 from the heat generated by the curing processing unit 50. Secondly, it is used to maximize the heat transferred to the curable material collector 40 by minimizing the heat lost to the surroundings. Preferably, the thermal insulator 60 is made of a good thermal insulating material such as polystyrene or ethylene vinyl acetate (EVA). The thermal insulator 60 can be fastened to the tray frame 70 by means of press-fit. Press-fit is an assembly method in which one part is forced under pressure into a hole of another part that is only slightly larger, whereby the two parts are held together via the resulting friction force.

Curing Processing Unit

Figure 3:
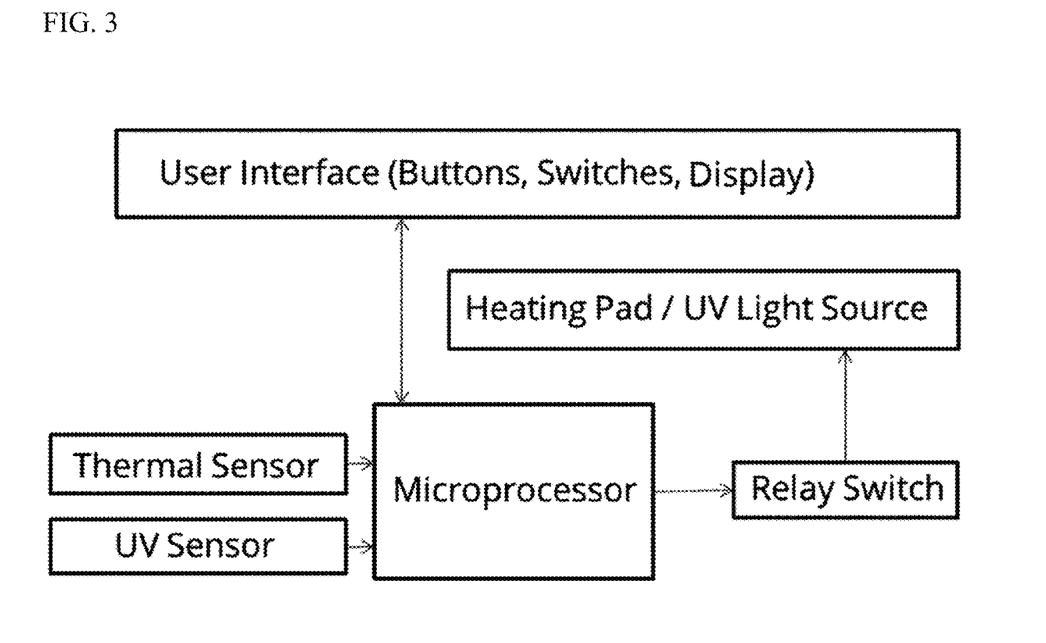
FIG. 3 is a schematic diagram of a curing processing unit of the workholding device according to the present invention.

The purpose of curing processing unit 50 is to facilitate curing of the liquid curable material 20. There are many different formulations of curable materials on the market. Some silicone can cure at room temperature, but they typically take hours to cure unless heated up. Other types of silicone can cure much faster, in the order of minutes, but require heating the solution to over 120° C. In recent years, there has been a new type of silicone that cures in seconds by exposure to ultraviolet rays. The curing processing unit should be designed to facilitate the curing process depending on the characteristics of a specific type of curable material chosen. Preferably, the curing processing unit 50 is designed to allow for replacement and exchange. For thermally-cured materials, the curing processing unit 50 may be an electronically controlled heating pad that heats the curable materials. For UV-cured materials, the curing processing unit 50 may be an ultraviolet light source that emits ultraviolet rays toward the curable materials. The ultraviolet light source may also be controlled in an electronical way. The curing processing unit 50 can be fastened to the thermal insulator 60 via press-fit. In an embodiment, the curing processing unit 50 is connected to a printed circuit board via electrical wires and controlled by onboard electronics 51. FIG. 3 shows a schematic diagram of electronics. The printed circuit board includes a heat sensor for detecting heat and/or an ultraviolet sensor for detecting the status of ultraviolet rays, a relay switch to turn on and off electricity to the heating pad or the UV light sources, and a microprocessor for processing the input data from the sensors and controlling the relay switch. The curing processing unit 50 further has a user interface (display 52 shown in FIG. 1), and includes control buttons, switches for varying system settings, as well as a display for outputting information and displaying user feedback.

Curable Material Collector

The purpose of curable material collector 40 is to collect the curable material 20 detached from the sacrificial support 30 during the application of the curable material, the curing of the curable material, and/or the machining of the workpiece. In the embodiment shown in FIGS. 1 and 2, the curable material collector 40 is configured as a tray, which prevents the curing processing unit 50 below from directly contacting the liquid curable material 20. Preferably, the tray facilitates the curing process of various types of the curable materials 20, and is designed to be replaceable and exchangeable. For thermally-cured materials, the tray can be made of a highly thermally-conductive material such as aluminum. For UV-cured materials, the tray can be made of a UV-transparent material such as polymethyl methacrylate, also known as acrylic. The tray can be fastened via screws or press-fitted to the thermal insulator 60 together with the curing processing unit 50.

Sacrificial Support

The sacrificial support 30 is used to support the workpiece 10, and allows for being damaged by a cutting tool of the machining equipment during machining of the workpiece 10. Preferably, a wasteboard is used as the sacrificial support 30. If the workpiece needs to be cut vertically all the way through beyond the bottom of the workpiece 10, any layer below the workpiece 10 may come in contact with the rotary cutter. A primary purpose of the wasteboard is to allow for sacrificial cut so as to protect layers beneath it from being damaged. A secondary purpose of the wasteboard is to provide a completely flat surface (relative to the milling machine) for the workpiece 10 to go on. While some wasteboard may visually look flat, it will often be slightly slanted naturally due to the slight variations of thickness of the material, albeit not visually detectable. This slant will cause the workpiece to be slanted in the vertical axis with respect to the milling machine and rotary cutter, resulting in poor cuts. In order to minimize the aforementioned defects, the wasteboard can be leveled down by milling a large pocket across the entire surface thereof. This will ensure that the wasteboard is consistently flat and equal distance from the rotary cutter across the entire surface, providing the workpiece with a level surface to rest upon. In an embodiment, the wasteboard is designed to have through-holes 31 across the entire surface. These holes serve multiple purposes. Firstly, the through-holes 31 allow more heat or ultraviolet rays from the curing processing unit 50 to reach the liquid curable materials 20 so as to facilitate curing. Secondly, the through-holes 31 further allow the use of traditional forms of clamps, such as the clamps described in the background art section, which can cooperate with the curable material 20 to ensure that the workpiece is secured in a predetermined position. Preferably, the wasteboard can be made of a semi-hard material that is dimensionally stable, durable, and yet easily cut, such as medium-density fiberboard (MDF). The wasteboard can be fastened to the curable material collector 40 via press-fit. The through-holes 31 can allow the curable material (such as silicone) to reach the curable material collector 40 (such as a silicone tray) for curing. The through-holes 31 can also be used as a pivot point of a small tool (such as a screwdriver) in the process of prying off the workpiece after milling.

First Embodiment

As shown in FIGS. 1 and 2, the workholding device comprises a wasteboard 30 and a silicone rubber 20 coated on the wasteboard 30. The workpiece 10 is fixed to the wasteboard 30 by curing the silicone rubber 20.

Correspondingly an embodiment of the present application also provides a workholding method for milling machines comprising the following steps of: arranging the wasteboard 30 on a bearing assembly; coating a silicone rubber 20 onto the wasteboard 30; closely adhering the workpiece 10 to the wasteboard 30 via the silicone rubber 20; curing the silicone rubber 20 so as to secure the workpiece 10.

It is to be understood that the bearing assembly is used to support various mechanisms arranged thereon. Further, the bearing assembly also serves to connect the milling machine's platform, so it can be positioned and fixed by traditional means such as screws and clamps.

The bearing assembly may include a tray frame 70 and a base plate 80. The tray frame 70 is fitly positioned over the base plate 80, and the base plate 80 is detachably mounted to the milling machine. The purpose of the base plate 80 is to make the tray frame 70 easy to be mounted to or dismounted from the milling machine, so as to ensure the interchangeability of various tray frames 70.

The tray frame 70 can be secured to the base plate by conventional screws or clamps, or by magnets. When magnets are used to secure the tray to the base plate, the tray frame 70 can be quickly disassembled and assembled, and it is also convenient for the tray frame 70 to maintain its relative positions on the milling machine before and after assembly/disassembly. The magnets can be a rare earth neodymium magnet to provide sufficient magnetic force. The magnets can be arranged at four corners of the tray frame 70 to provide uniform force. Alignment programmed magnets are rare-earth neodymium magnets that have gone through a special magnetization process to change the shape of their magnetic fields so as to achieve precise alignment properties. When two alignment programmed magnets attract each other, they will fit closely at precise positions. When the magnets of the tray frame 70 are fitted to the magnets of the base plate 80, the tray frame is held in place by the magnetic force between all the pairs of magnets 90.

Consistent positioning of the workholding device can be achieved, since the engagement position between the magnets 90 of the tray frame 70 and the magnets of the base plate 80 is consistent and repeatable each time the workholding device is mounted. It is important to ensure consistent positioning of the workholding device during machining of the workpiece. For example, in case an unfinished milling operation is continued on a previously replaced workholding device, it is vitally important to position the workholding device in a position and direction similar to previously. Otherwise, the path of rotary cutter will deviate from the predetermined path, resulting in damage to the workpiece.

The workholding device further includes a curable material tray 40, which is located below the wasteboard 30 and is used to collect excess silicone rubber 20 during curing and machining. The curable material tray 40 can prevent the liquid silicone rubber 20 from direct contact with the members below. The curable material tray 40 is designed to facilitate the curing of a corresponding specific type of silicone rubber 20. Therefore, the curable material tray 40 can be designed to be detachable and exchangeable, so as to be adapted to various silicone rubbers 20. The relative positions of the curable material tray 40 can be fixed by conventional means such as screws or press-fit.

The wasteboard 30 is a member capable of providing a surface for connecting the silicone rubber 20 with the workpiece 10. Moreover, if the milling cutter is required to cut vertically into the bottom of the entire workpiece 10 during milling, the wasteboard 30 can provide a sacrificial cutting margin. In addition, the wasteboard 30 can provide a relatively flat surface to improve the machining accuracy of the workpiece 10. The wasteboard 30 can be mounted to the curable material tray 40 by press-fit, or by conventional means such as screws and clamps. When the wasteboard has reached its loss threshold within the expected life due to multiple uses, they can be replaced in time by means of these screws and clamps.

The silicone rubber 20 has two characteristics of being curable and being liquid when it is not cured. Unlike adhesives, the silicone rubber 20 becomes a solid with certain elasticity after curing, and is chemically inert, so it is not easy to chemically react with the surface of other materials attached to it, and its melting point is high and so it is not easy to melt. Due to such a stable chemical structure, the silicone rubber 20 will not stick to the milling cutter, nor will it melt under the high temperature caused by the high-speed rotation of the milling cutter. In addition, the silicone rubber 20 also has the advantage of low cost.

Accordingly, the following operations can be followed during milling:

1. The wasteboard 30 is arranged onto the bearing assembly. As mentioned above, the wasteboard 30 can be firmly secured in a traditional way, so that it will not slip during the working of the milling machine.
2. The silicone rubber 20 is a high-viscosity liquid when it is in an uncured form. The liquid silicone can spread evenly on the surface of the wasteboard 30 due to its viscosity and plasticity. Silicone rubber 20 is coated onto the wasteboard 30. After the liquid silicone rubber 20 is coated onto the wasteboard 30, it can slowly infiltrate into fine pores and through-holes in the wasteboard 30, infiltrate down and contact a surface of the curable material tray 40, so the silicone rubber can be cured more effectively by heating or UV light.
3. The workpiece 10 is tightly attached to the wasteboard 30 via the silicone rubber 20. The workpiece 10 can be preliminarily fixed by means of the viscosity of the silicone rubber 20. Upon applying a pressure on the top of the workpiece 10, the silicone rubber 20 will be squeezed into a thin layer. At this time, the silicone rubber 20 can accurately fill the gap between the bottom of the workpiece 10 and the top of the wasteboard 30.

4. The curable silicone rubber 20 is cured via the curable material tray 40 by means of the curing processing unit 50, so as to secure the workpiece 10. During curing, the silicone rubber 20 will occupy the gap between the workpiece 10 and wasteboard, forming a negative pressure therein. As a result, atmospheric pressure in the environment forces the workpiece 10 to be firmly secured at a designated position.

5. After milling, the silicone rubber 20 is also destroyed. At this time, the workpiece 10 can be easily removed by applying a force in the horizontal direction perpendicular to the suction force of the silicone rubber 20. Since the silicone rubber 20 is elastic, the peeling operation can be easily performed, and residues are not easily generated. Silicone rubber 20 is a sacrificial material and must be replaced after each milling.

From this, it can be seen that, the workholding device provided in the embodiment of the present application has many advantages compared with many milling machine clamps in the prior art. For example, compared with vertical clamps and horizontal clamps, the silicone rubber 20 does not occupy the space of the workpiece 10 in various directions, and can be machined better in multiple directions. Compared with magnetic clamps, the workholding device provided in the embodiment of the present application has no special requirements on the material of the workpiece 10. Compared with vacuum table, the silicone rubber 20 is low in cost and inducing no noise, and is capable of separating a whole piece of the workpiece 10 from a raw material. Compared with fixation by adhesives, the silicone rubber 20 is resistant to high temperature and will not adversely affect the milling cutter. Also, the workholding device provided in the embodiment of the present application can secure the workpiece 10 by means of atmospheric pressure, so it is easy to separate the workpiece 10, with no residues generated. Compared with the design of bridges and tabs, the workholding device provided in the embodiment of the present application has many advantages such as fewer machining steps, lower cost and higher yield.

Second Embodiment

Main improvement of the second embodiment over the first embodiment is that curing of the silicone rubber 20 is accelerated by a curing processing unit 50. The curing processing unit 50 is positioned below the curable material tray 40, and curing rate of the curable material 20 is adjusted by changing at least one of the factors that affects curing.

Some silicone rubber 20 can be cured within only a few minutes when it is heated to a temperature above 120° C. In other words, when this type of silicone rubber 20 is heated up, the curing speed of the silicone rubber 20 can be significantly increased. Accordingly, it is possible to achieve an accelerated curing of the silicone rubber 20 by providing various temperature-based regulating devices such as heating coils and heating pads, electromagnetic heating devices and so on.

In order to be applicable to various types of silicone rubber 20, the curing processing unit 50 may be mounted below the curable material tray 40 in a detachable way. The curing processing unit 50 may be mounted to the bearing assembly in various forms. It is to be understood that the curing processing unit 50 can include a curing rate regulator (it can be understood as a mechanism generating heat in this embodiment, such as a heating pad), a controller, and a user interface 52 (it can be understood as a panel for controlling the curing rate regulator in this embodiment, which includes a body, knob, temperature display, switch and the like). In order to prevent the electronics from the heat of the heating pad, a thermal insulator 60 is provided between the heating pad and the bearing assembly. The curing processing unit 50 includes a curing rate regulator, which is arranged in the thermal insulator 60 to directly accelerate curing of the silicone rubber 20, and a controller and user interface 52, which are arranged outside the thermal insulator 60 and are electrically connected to the curing rate regulator for controlling and adjusting the curing rate regulator.

The thermal insulator 60 plays the role of insulating heat, and the thermal insulator 60 is provided to prevent the heat from overflowing to the milling machine's platform during heating. In addition to preventing damage to the electronics, the thermal insulator 60 can also minimize the heat transferred to the surroundings, so that most of the heat generated by the curing rate regulator will be transferred to the silicone rubber 20, which saves energy. The thermal insulator 60 can be made of an excellent thermal insulation material such as aluminum silicate ceramic fiber or ethylene vinyl acetate (EVA). In addition, a hole may be formed in the thermal insulator 60 for the cable to pass through.

In this embodiment, the curable material tray 40 can prevent the silicone rubber 20 from contacting the curing rate regulator, and play a more important protective role. In order to provide good thermal conductivity, the curable material tray 40 can be made of a material with high thermal conductivity (such as metal aluminum, copper, etc.).

Accordingly, this embodiment provides a workholding process:

1. The wasteboard 30 is arranged onto the bearing assembly. As mentioned above, the wasteboard 30 can be firmly secured in a traditional way so that it will not slip during the working of the milling machine.

2. The silicone rubber 20 is coated onto the wasteboard 30. After the liquid silicone rubber 20 is coated onto the wasteboard 30, it can slowly infiltrate into fine throughholes 31 in the wasteboard 30. The silicone rubber 20 is a high-viscosity liquid when it is in an uncured form, and can spread evenly on the surface of the wasteboard 30 due to its viscosity and plasticity.

3. The workpiece 10 is tightly attached to the wasteboard 30 via the silicone rubber 20. The workpiece 10 can be preliminarily fixed by means of the viscosity of the silicone rubber 20. Upon applying a pressure on the top of the workpiece 10, the silicone rubber 20 will be squeezed into a thin layer. At this time, the silicone rubber 20 can accurately fill the gap between the bottom of the workpiece 10 and the top of the wasteboard 30.

4. The electronic regulating mechanism is operated to set the heating temperature and heating time. The curing rate regulator will heat the silicone rubber 20 so that the silicone rubber 20 is cured. The silicone rubber 20 will occupy the gap between the workpiece 10 and the wasteboard 30 during curing, and create a negative pressure therein. Accordingly, the atmospheric pressure in the environment will force the workpiece 10 to be firmly secured at a designated position. After curing, the curing processing unit 50 will automatically stop working according to the settings of a timer or a temperature sensor and the like.

5. After milling, the silicone rubber 20 is also destroyed. At this time, the workpiece 10 can be easily removed by applying a force in the horizontal direction perpendicular to the suction force of the silicone rubber 20. Since the silicone rubber 20 is elastic, the peeling operation can be easily performed, and residues are not easily generated. Silicone rubber 20 is a sacrificial material and must be replaced after each milling.

Third Embodiment

Main difference between the third embodiment and the second embodiment is that the curing processing unit 50 in the second embodiment is a temperature-based regulating device, while the curing processing unit 50 in the third embodiment of the present application is a UV light source. Accordingly, the step of curing the silicone rubber 20 in the workholding method of this embodiment comprises: irradiating ultraviolet rays to accelerate the curing of the silicone rubber 20. Some silicone rubber 20 can be cured within a few seconds when exposed to the ultraviolet rays. Hence, accelerated curing procedure for the silicone rubber 20 can be completed quickly by means of a UV light source.

In case a UV light source is provided, the bearing assembly may not include the thermal insulator 60, since heat is not generated too much. At this time, the curing processing unit 50 may include a curing rate regulator for directly accelerating the curing of the silicone rubber 20, and an electronic regulating mechanism which is electrically connected to the curing rate regulator for controlling and adjusting the curing rate regulator. Among them, the curing rate regulator may include UV lamps arranged in an array. In case a UV light source is employed, a wasteboard 30 that is transparent or translucent to ultraviolet rays may be provided, so that the UV rays can pass through the wasteboard 30 to reach the surface of the silicone rubber 20. In addition, the curable material tray 40 also needs to be made of a material that is transparent or translucent to ultraviolet rays, such as polymethyl methacrylate also known as acrylic.

Accordingly, this embodiment provides a workholding process for milling machines:

1. The wasteboard 30 is arranged onto the bearing assembly. As mentioned above, the wasteboard 30 can be firmly secured in a traditional way so that it will not slip during the working of the milling machine.
2. The silicone rubber 20 is coated onto the wasteboard 30. After the liquid silicone rubber 20 is coated onto the wasteboard 30, it can slowly infiltrate into fine through-holes 31 in the wasteboard 30. The silicone rubber 20 is a high-viscosity liquid when in an uncured form, and can spread evenly on the surface of the wasteboard 30 due to its viscosity and plasticity.
3. The workpiece 10 is tightly attached to the wasteboard 30 via the silicone rubber 20. The workpiece 10 can be preliminarily fixed by means of the viscosity of the silicone rubber 20. Upon applying a pressure on the top of the workpiece 10, the silicone rubber 20 will be squeezed into a thin layer. At this time, the silicone rubber 20 can accurately fill the gap between the bottom of the workpiece 10 and the top of the wasteboard 30.
4. The electronic regulating mechanism is operated to set the UV irradiation time. The curing rate regulator will irradiate the silicone rubber 20 so that the silicone rubber 20 is cured. The silicone rubber 20 will occupy the gap between the workpiece 10 and wasteboard 30 during curing, and create a negative pressure therein. Accordingly, atmospheric pressure in the environment will force the workpiece 10 to be firmly secured at a designated position. After curing, the curing processing unit 50 will automatically stop working according to the settings of a timer or a temperature sensor and the like.
5. After milling, the silicone rubber 20 is also destroyed. At this time, the workpiece 10 can be easily removed by applying a force in the horizontal direction perpendicular to the suction force of the silicone rubber 20. Since the silicone rubber 20 is elastic, the peeling operation can be easily performed, and residues are not easily generated. Silicone rubber 20 is a sacrificial material and must be replaced after each milling. Compared with curing by heat, curing by UV rays may consume less energy and involve a faster curing speed. Also, the overall structure of the workholding device can be simpler and the service life can be longer, because heat insulation is no longer required.

Fourth Embodiment

The fourth embodiment involves a further improvement to any one of the first to third embodiments. Main improvement lies in that, in the fourth embodiment, a through-hole 31 is formed on the surface of the wasteboard 30 in contact with the workpiece 10 (referring to FIGS. 1 and 2).

There may be multiple through-holes, which are densely distributed or distributed in an array in the wasteboard 30. The through-holes serve many purposes. First, the through-holes can be infiltrated by the silicone rubber 20 to better generate a negative pressure relative to the atmospheric pressure and to provide a more stable fixation. Second, in case the curing processing unit 50 is provided, for the heated type of curing rate regulator, the through-holes can allow heat to pass through the wasteboard 30 more quickly and act on the silicone rubber 20; whereas for the UV type of curing processing unit 50, the through-holes can allow more ultraviolet rays to pass through the wasteboard 30 and act on the silicone rubber 20, and also allow the use of an opaque wasteboard 30. Further, since the opaque wasteboard 30 can be used, the selectivity of the wasteboard 30 is increased, which is very beneficial for reducing the whole costs.

In addition, the wasteboard 30 formed with through-holes has further advantages. For example, the workholding device may optionally further include a traditional clamp fixed to the bearing assembly, and the traditional clamp fixes the workpiece 10 via the through-holes. Among them, the traditional clamp may be a horizontal clamp. Using a traditional clamp as well as the workholding device provided in the embodiments of the present application can provide a further fixing force, thereby further preventing the workpiece 10 from slipping. Moreover, the through-holes can act as fulcrums for some small tools, such as for supporting a screwdriver so as to pry the workpiece 10 after milling.

Fifth Embodiment

With the curing processing unit 50 arranged, the curing of the silicone rubber 20 can be significantly accelerated. However, factors such as the amount of silicone rubber 20 and the change in ambient temperature may affect the time required for curing. Therefore, simply setting a set of automatic curing procedures cannot meet the requirements of automatically controlling the curing processing unit 50 in all scenarios.

Figure 4:
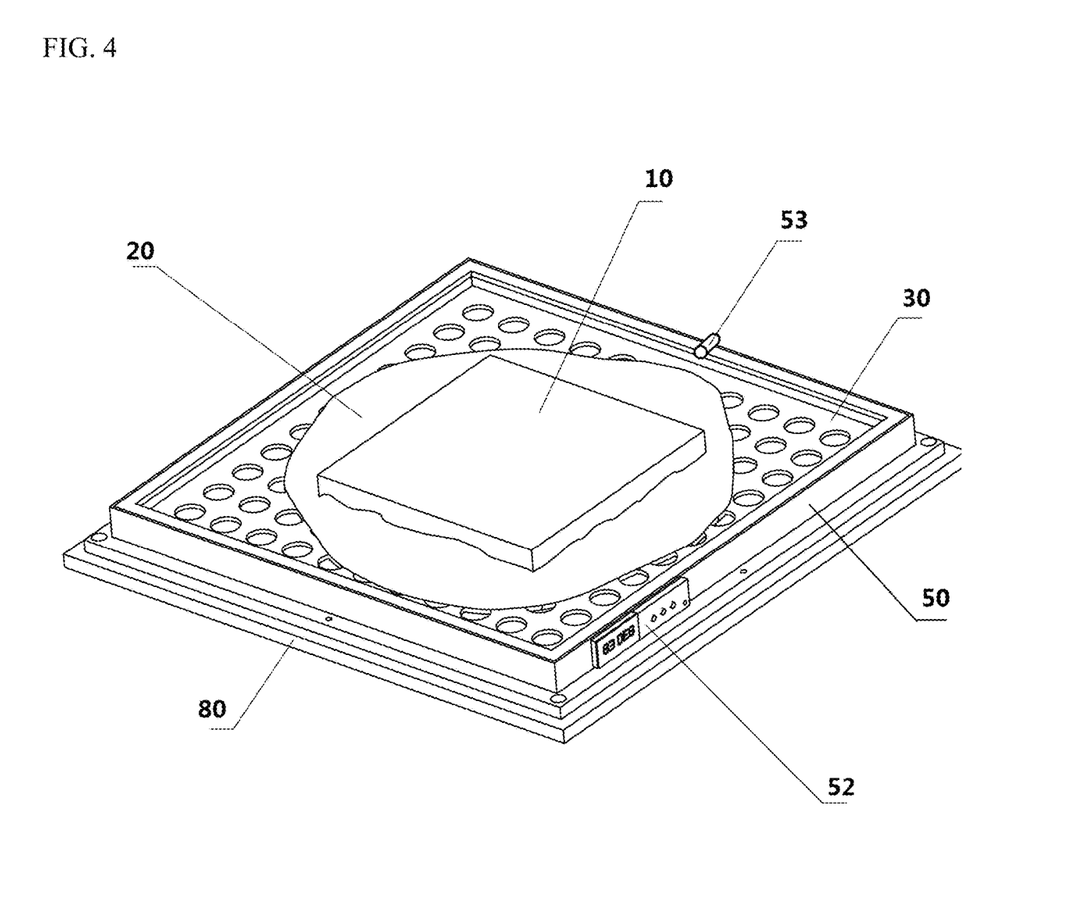
FIG. 4 is an overall schematic diagram of the workholding device according to the present invention when provided with a curing sensor.

In light of this, the workholding device in the fifth embodiment further comprises a curing sensor 53 which is in communication with the curing processing unit 50. The curing sensor 53 sends a stop signal to the curing processing unit 50 as it detects that the silicone rubber 20 has been cured, and the curing processing unit 50 will then stop the accelerated curing of the silicone rubber 20 in response to the stop signal.

The silicone rubber 20 may change from a clear and transparent state to a turbid state in the process of curing. Therefore, some optical sensors can be used to monitor whether the silicone rubber 20 has been cured or not by measuring the properties of the refraction or heat dissipation light. The curing sensor 53 as used can be implemented in a variety of forms, and typically, a turbidity sensor can be used for measurement.

Notably, after the silicone rubber 20 is monitored to have been cured, it can be delayed for a specified time before sending the stop signal to the curing processing unit 50, so that the silicone rubber 20 can be cured more completely. Optionally, after the curing processing unit 50 receives the stop signal, it can be automatically delayed for a specified time before executing the stop signal. There may be more specific control ways, which can be selected and improved according to the actual working environment, and thus are not repeated herein.

It is to be understood that the curing sensor 53 can be mounted to the bearing assembly of the workholding device, or can be directly mounted to the milling machine. The curing sensor 53 can further communicate with control mechanisms of the milling machine itself, so that the milling machine can automatically perform the milling operation after the curing is completed.

With the aid of the curing sensor 53, the curing processing unit 50 can be automatically stopped, which can avoid unnecessary energy waste and achieve the effects of energy saving and emission reduction. Moreover, workers do not have to wait for completion of the curing process by the milling machine, so the fixation of the workpiece 10 and the working of the milling machine can be automatically and continuously performed, significantly improving the automation level of the milling machine workholding and even the whole milling machine.

Finally, those of ordinary skill in the art can understand that, many technical details are proposed in the embodiments of the present application, so that readers can better understand the application. However, the technical solutions claimed by the claims of this application can be basically realized, even without such technical details and variations or modifications based on the foregoing embodiments. Therefore, various changes can be made in practice to the above-mentioned embodiments in the forms and details, without departing from the spirit and scope of the present application.

What is claimed is:

1. A workholding device for positioning a workpiece on a machining equipment, comprising:
    a sacrificial support for supporting the workpiece;
    a workpiece holding layer formed of a curable material applied onto the sacrificial support, which secures the workpiece at a predetermined position on the sacrificial support after completion of curing, the sacrificial support and the workpiece holding layer allowing for being damaged by a cutting tool of the machining equipment during the machining of the workpiece;
    a curable material collector which is arranged below the sacrificial support for collecting a curable material detached from the sacrificial support during the application of the curable material, the curing of the curable material,
and/or the machining of the workpiece;
    a curing processing unit which comprises a controller and a curing rate regulator, the controller controlling the curing rate regulator to adjust a curing rate of the curable material by changing at least one of factors affecting curing; and
    a bearing assembly for supporting the sacrificial support, the curable material collector and the curing processing unit, which is configured to be removably mounted to the machining equipment;
    wherein the curable material is a solid which is viscous before curing and elastic after curing, and has a melting point above 1000° C.

2. The workholding device according to claim 1, wherein the sacrificial support has a flat surface contacting the workpiece via the workpiece holding layer, and at least one through-hole penetrating the sacrificial support is formed on the flat surface.

3. The workholding device according to claim 2, wherein a plurality of through-holes are formed on the flat surface, and at least one of the plurality of through-holes is adapted to mount a workpiece clamp.

4. The workholding device according to claim 1, wherein the curable material comprises silicone rubber.

5. The workholding device according to claim 1, wherein,
    the factors affecting curing include temperature, the curing rate regulator includes a heating pad, and the controller controls the heating pad to adjust the curing rate of the curable material by varying curing temperature,
    the heating pad clings to the curable material collector, and
    the machining equipment is a milling machine.

6. The workholding device according to claim 1, wherein,
    the factors affecting curing include ultraviolet rays, the curing rate regulator includes an ultraviolet light source, and the controller controls the ultraviolet light source to adjust the curing rate of the curable material by varying ultraviolet radiation parameters,
    the ultraviolet light source is located below the curable material collector, and the curable material collector is made of an ultraviolet transparent material,
    the ultraviolet transparent material comprises polymethyl methacrylate,
    the machining equipment is a milling machine.

7. The workholding device according to claim 1, wherein,
    the curing processing unit further comprises at least one of a temperature sensor and an ultraviolet sensor, and the controller controls operation of the curing rate regulator on the basis of data measured by the temperature sensor and/or the ultraviolet sensor,
    the curing processing unit further comprises a display interface for displaying at least one of current temperature, target temperature, current ultraviolet parameters and target ultraviolet parameters, and a user input interface allowing a user to set at least one of the target temperature and the target ultraviolet parameters,
    the machining equipment is a milling machine.

8. The workholding device according to claim 1, wherein, the curing processing unit further comprises a curing sensor, which is in communication with the controller and sends a curing completion signal to the controller when the completion of curing of the curable material is detected by the curing sensor, the curing sensor determines whether the curable material has been cured via an optical measurement, the machining equipment is a milling machine.

9. The workholding device according to claim 1, further comprising a thermal insulator positioned between the curing processing unit and the bearing assembly, the curable material collector is a collecting tray, the sacrificial support is secured to the collecting tray by press-fit, and the collecting tray and the curing rate regulator are press-fitted to the thermal insulator, the bearing assembly comprises a tray holding the thermal insulator, and a base configured to be removably mounted to the machining equipment, the base and the tray are provided with magnets at positions aligned with each other, and fixation and connection between the base and the tray is achieved through attraction by the magnets, the magnets are programmable magnets located at an edge or a corner of the base and the tray, the machining equipment is a milling machine.

10. A method for positioning a workpiece on a machining equipment, comprising:

providing a sacrificial support, which allows for being damaged by a cutting tool of the machining equipment during machining of the workpiece;

applying a curable material onto the sacrificial support;

placing the workpiece on the sacrificial support while the curable material is not cured;

curing the curable material to form a workpiece holding layer, and securing the workpiece at a predetermined position on the sacrificial support;

providing a curing processing unit, which comprises a controller and a curing rate regulator, the controller controlling the curing rate regulator to adjust a curing rate of the curable material by changing at least one of factors affecting curing;

providing a curable material collector, which is used to collect a curable material detached from the sacrificial support during the application of the curable material, the curing of the curable material, and/or the machining of the workpiece; and providing a bearing assembly, which is used to support the sacrificial support, the curable material collector and the curing processing unit, and which is removably mounted to the machining equipment;

wherein the curable material is a solid which is viscous before curing and elastic after curing, and has a melting point above 1000° C.

11. The method according to claim 10, wherein after the workpiece is placed on the sacrificial support, pressure is applied to the workpiece so that the curable material fills a gap between the workpiece and the sacrificial support.

12. The method according to claim 10, wherein the providing a sacrificial support comprises: providing a sacrificial-support with a flat surface, and forming on the flat surface at least one through-hole penetrating the sacrificial support.

13. The method according to claim 12, further comprising: forming a plurality of through-holes on the flat surface, and mounting a workpiece clamp for clamping the workpiece with at least one of the plurality of through-holes.

14. The method according to claim 10, wherein the curable material comprises silicone rubber.

15. The method according to claim 10, wherein, the factors affecting curing include temperature, the curing rate regulator includes a heating pad, and the method comprises: controlling the heating pad with the controller to adjust the curing rate of the curable material by varying the curing temperature, further comprising: making the heating pad cling to the curable material collector, and, the machining equipment is a milling machine.

16. The method according to claim 10, wherein, the factors affecting curing include ultraviolet light, the curing rate regulator includes an ultraviolet light source, and the method comprises: controlling the ultraviolet light source with the controller to adjust the curing rate of the curable material by varying ultraviolet irradiation parameters, further comprising: arranging the ultraviolet light source below the curable material collector, and fabricating the curable material collector with an ultraviolet transparent material, the machining equipment is a milling machine.

17. The method according to claim 10, wherein, the curing processing unit further comprises at least one of a temperature sensor and an ultraviolet sensor, and the method further comprises: controlling operation of the curing rate regulator with the controller, according to data measured by the temperature sensor and/or the ultraviolet sensor, the curing processing unit further comprises a display interface for displaying at least one of current temperature, target temperature, current ultraviolet parameters and target ultraviolet parameters, and a user input interface allowing a user to set at least one of the target temperature and the target ultraviolet parameters, the machining equipment is a milling machine.

18. The method according to claim 10, wherein, the curing processing unit further comprises a curing sensor, which is in communication with the controller and sends a curing completion signal to the controller when the completion of curing of the curable material is detected by the curing sensor, the curing sensor determines whether the curable material has been cured via an optical measurement, the machining equipment is a milling machine.

19. The method according to claim 10, further comprising: providing a thermal insulator and arranging it between the curing processing unit and the bearing assembly, the curable material collector is a collecting tray, and the method comprises: press-fitting and securing the sacrificial support to the collecting tray, and press-fitting the collecting tray and the curing rate regulator to the thermal insulator, the bearing assembly comprises a tray and a base, and the method comprises: holding the thermal insulator with the tray, and removably mounting the base to the machining equipment, further comprising: providing magnets on the base and the tray at positions aligned with each other, and fixedly connecting the base and the tray with the magnets, the magnets are programmable magnets located at an edge or a corner of the base and the tray, the machining equipment is a milling machine.

* * * * *